(12) United States Patent
Lin

(10) Patent No.: US 6,942,138 B2
(45) Date of Patent: *Sep. 13, 2005

(54) FUEL-BASED APPLIANCE WITH VOCAL FUNCTION

(76) Inventor: Arlo H. T. Lin, Akara Building, 24 De Castro Street, Wickhams Cay I, Road Town, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 10/862,744

(22) Filed: Jun. 7, 2004

(65) Prior Publication Data

US 2004/0217148 A1 Nov. 4, 2004

Related U.S. Application Data

(63) Continuation-in-part of application No. 10/346,944, filed on Jan. 17, 2003, now Pat. No. 6,793,115.

(51) Int. Cl.[7] .............................. B23K 3/02; F23Q 7/12
(52) U.S. Cl. ............................ 228/51; 228/53; 431/255
(58) Field of Search ............. 228/51, 53; 219/227–229, 219/240, 507; 126/226, 236, 237, 401, 412; 431/255

(56) References Cited

U.S. PATENT DOCUMENTS

| 4,691,691 A | 9/1987 | Patenaude ................. 126/414 |
| 4,708,278 A | 11/1987 | Opfer ....................... 228/122.1 |
| 5,044,936 A * | 9/1991 | Frigiere ..................... 431/344 |
| 5,868,633 A | 2/1999 | Keheley ..................... 473/220 |
| 5,944,508 A * | 8/1999 | Bonnema .................... 431/255 |
| 6,037,724 A | 3/2000 | Buss et al. ................... 318/71 |
| 6,037,872 A | 3/2000 | Dunnum .................... 340/586 |
| 6,111,495 A | 8/2000 | Garside .................. 340/309.7 |
| 6,129,292 A | 10/2000 | Leung et al. ................ 239/33 |
| 6,148,700 A | 11/2000 | Upholz ........................ 81/486 |
| 6,793,115 B2 * | 9/2004 | Lin ............................. 228/51 |
| 2002/0172017 A1 | 11/2002 | Tarnowski et al. .......... 361/730 |
| 2003/0013959 A1 | 1/2003 | Grunwald et al. .......... 600/437 |
| 2004/0029060 A1 * | 2/2004 | Oglesby et al. ............. 431/255 |
| 2004/0115579 A1 * | 6/2004 | Lin ............................ 431/153 |

* cited by examiner

Primary Examiner—Lynne R. Edmondson
(74) Attorney, Agent, or Firm—Alan D. Kamrath; Nikolai & Mersereau, P.A.

(57) ABSTRACT

A fuel-based appliance is equipped with a vocal device. The fuel-based appliance includes a switch installed thereon. The vocal device is installed in the fuel-based appliance. The vocal device includes a circuit board, a chip installed on the circuit board, a speaker installed on the circuit board and a button that is connected with the circuit board and that can be pressed via moving the switch.

6 Claims, 5 Drawing Sheets

FUEL-BASED APPLIANCE WITH VOCAL FUNCTION

CROSS-REFERENCE

The present application is a continuation-in-part application of U.S. patent application Ser. No. 10/346,944 filed on Jan. 17, 2003, now U.S. Pat. No. 6,793,115.

BACKGROUND OF INVENTION

1. Field of Invention

The present invention relates to a fuel-based appliance with a vocal function.

2. Related Prior Art

Many appliances have been devised for various task. Almost all of the appliances hurt users if not used properly. Some of them might even cause grave wounds to users. For example, fuel-based appliances, that consume fuel to generate energy for work, might cause severe wounds to users. Improper use may results from users' absent-mindedness or unfamiliarity with the appliances.

Hence, the present invention is intended to obviate or at least alleviate the problems encountered in the prior art.

SUMMARY OF INVENTION

It is the primary objective of the present invention to provide a fuel-based appliance with a vocal function.

According to the present invention, a fuel-based appliance is equipped with a vocal device. The fuel-based appliance includes a switch installed thereon. The vocal device is installed in the fuel-based appliance. The vocal device includes a circuit board, a chip installed on the circuit board, a speaker installed on the circuit board and a button that is connected with the circuit board and that can be pressed via moving the switch.

Other objectives, advantages, and novel features of the invention will become more appararent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF EMBODIMENTS

Figure 1:
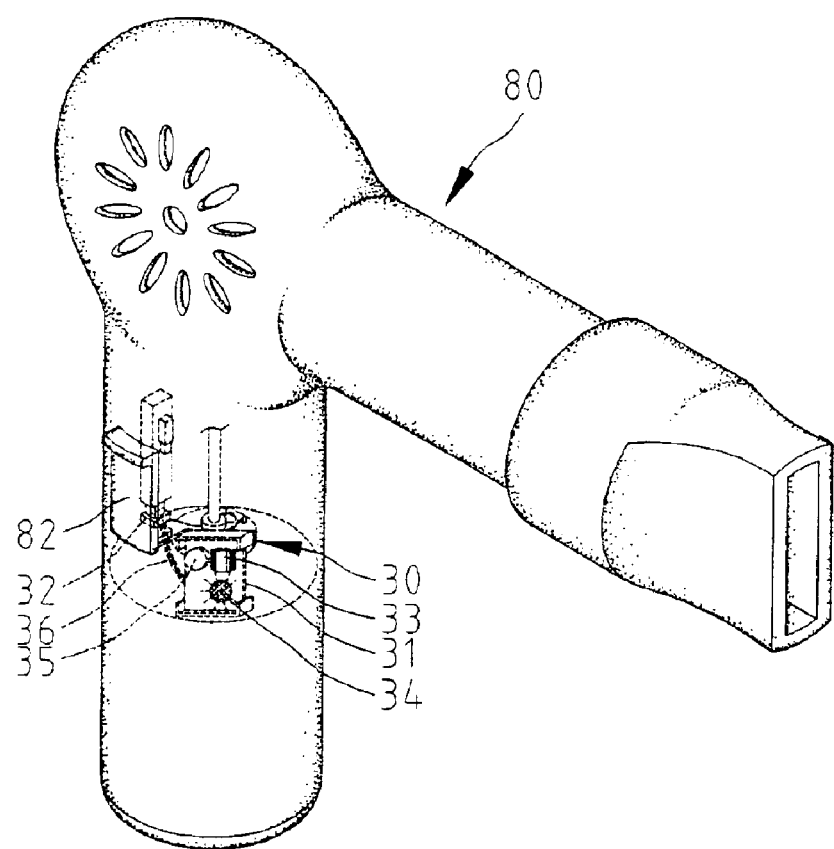
FIG. 1 is a perspective view of a fuel-based hair dryer with a vocal function according to a first embodiment of the present invention.
Figure 2:
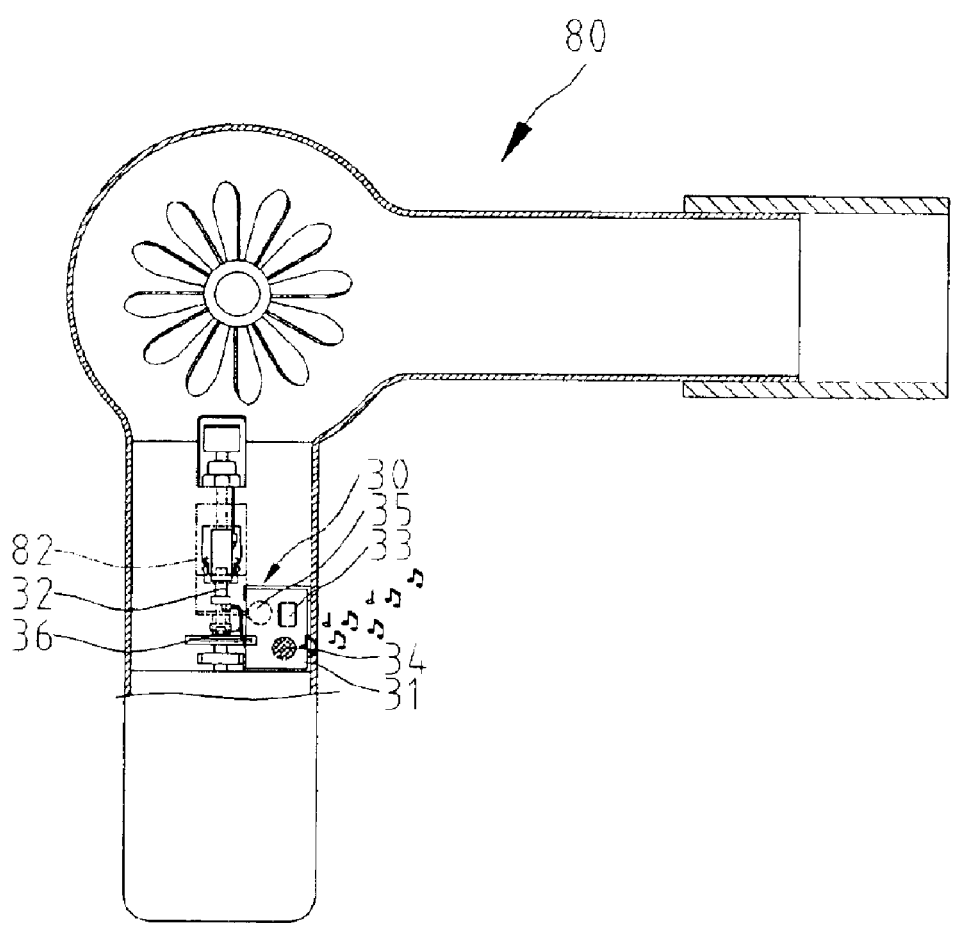
FIG. 2 is a cross-sectional view of the fuel-based hair dryer of FIG. 1.

Referring to FIGS. 1 and 2, according to a first embodiment of the present invention, a fuel-based hair dryer 80 is equipped with a vocal device 30. The fuel-based hair dryer 80 includes a switch 82 installed on a proper portion of the fuel-based hair dryer 80 such as a handle (not numbered) as shown. The vocal device 30 is installed in the fuel-based hair dryer 80. The vocal device 30 includes a circuit board 31 and a button 32 connected with the circuit board 31 through a wire 36. The button 32 can be pushed via moving the switch 82. A chip 33, a speaker 34 and a battery 35 are installed on the circuit board 30.

Figure 3:
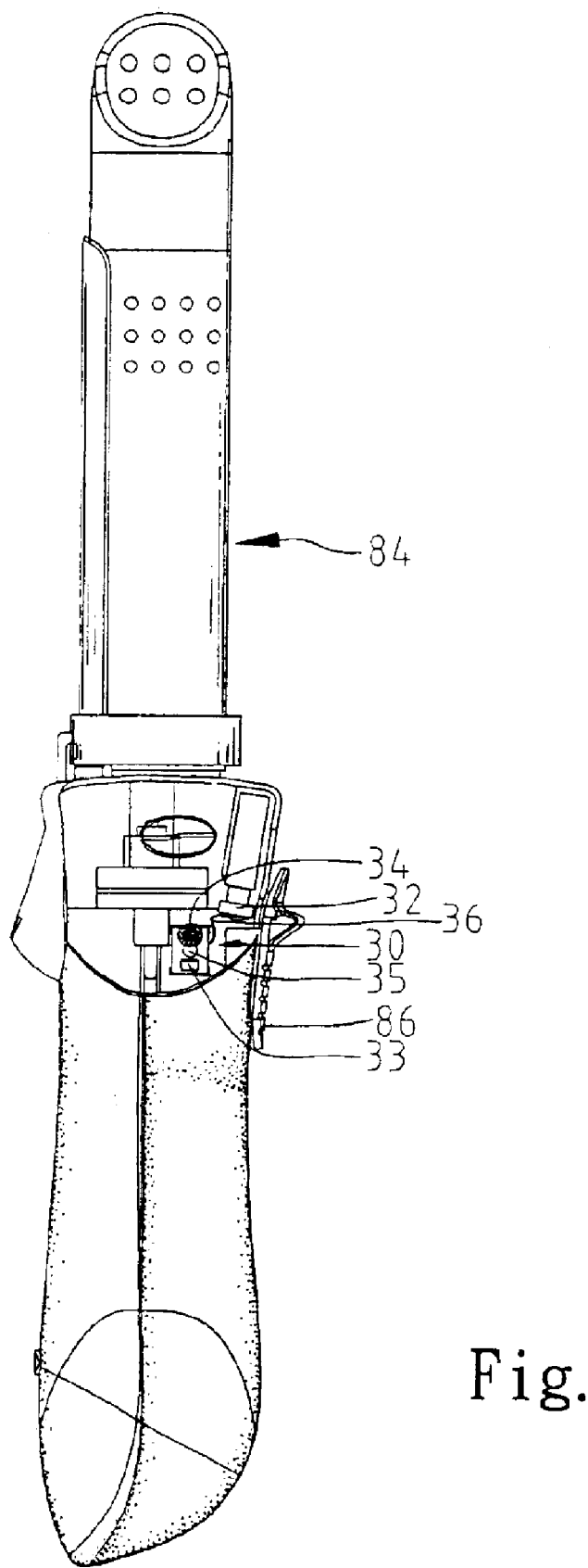
FIG. 3 is a side view of a fuel-based curling iron with a vocal function according to a second embodiment of the present invention.

Referring to FIG. 3, according to a second embodiment of the present invention, the vocal device 30 is used in a fuel-based curling iron 84. The fuel-based curling iron 84 includes a switch 86 installed on a proper portion of the fuel-based curling iron 84 such as a handle (not numbered) as shown. The button 32 can be pushed via moving the switch 86.

Figure 4:
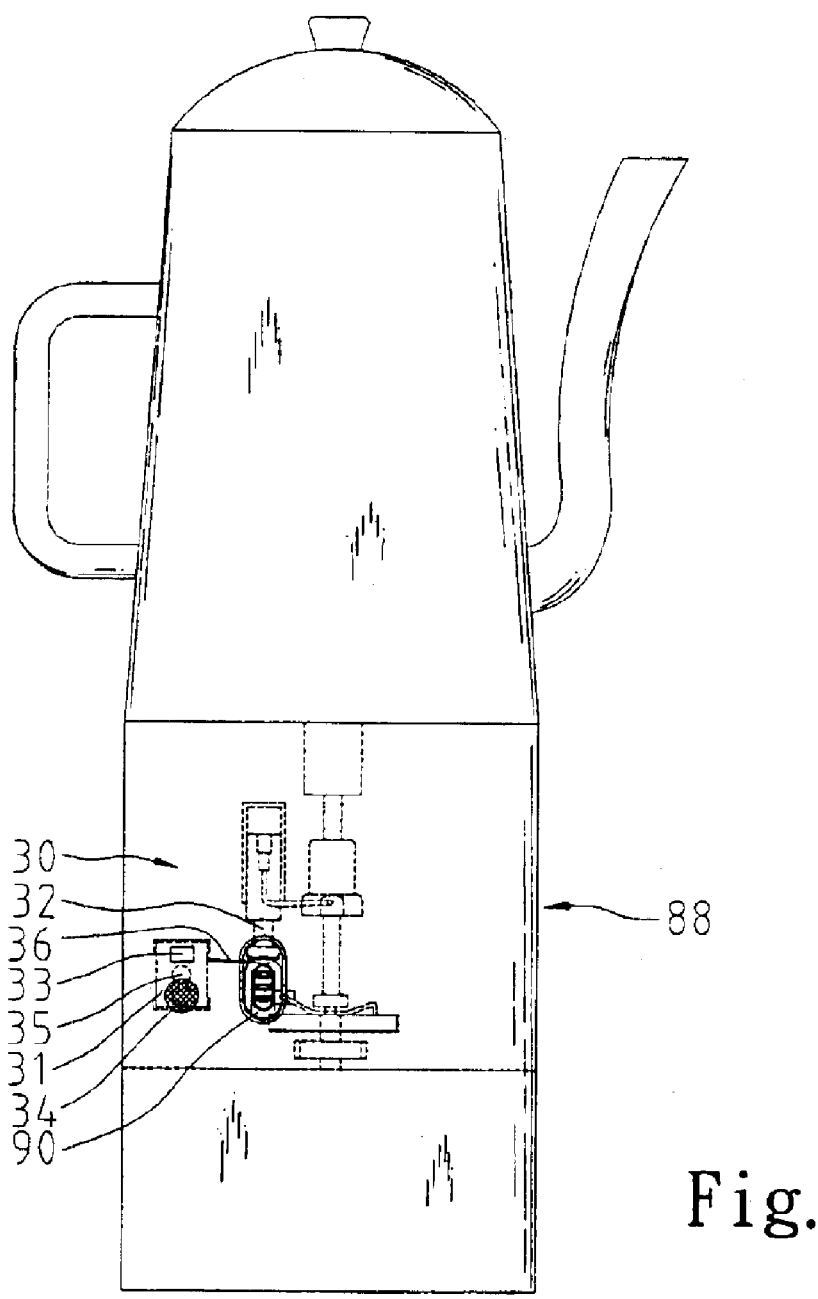
FIG. 4 is a side view of a gas burner with a vocal function according to a third embodiment of the present invention.

Referring to FIG. 4, according to a third embodiment of the present invention, the vocal device 30 is used in a gas burner 88. As shown, the gas burner 88 is used in a coffee maker. The gas burner 88 includes a switch 90 installed on a proper portion of the gas burner 88. The button 32 can be pushed via moving the switch 90.

Figure 5:
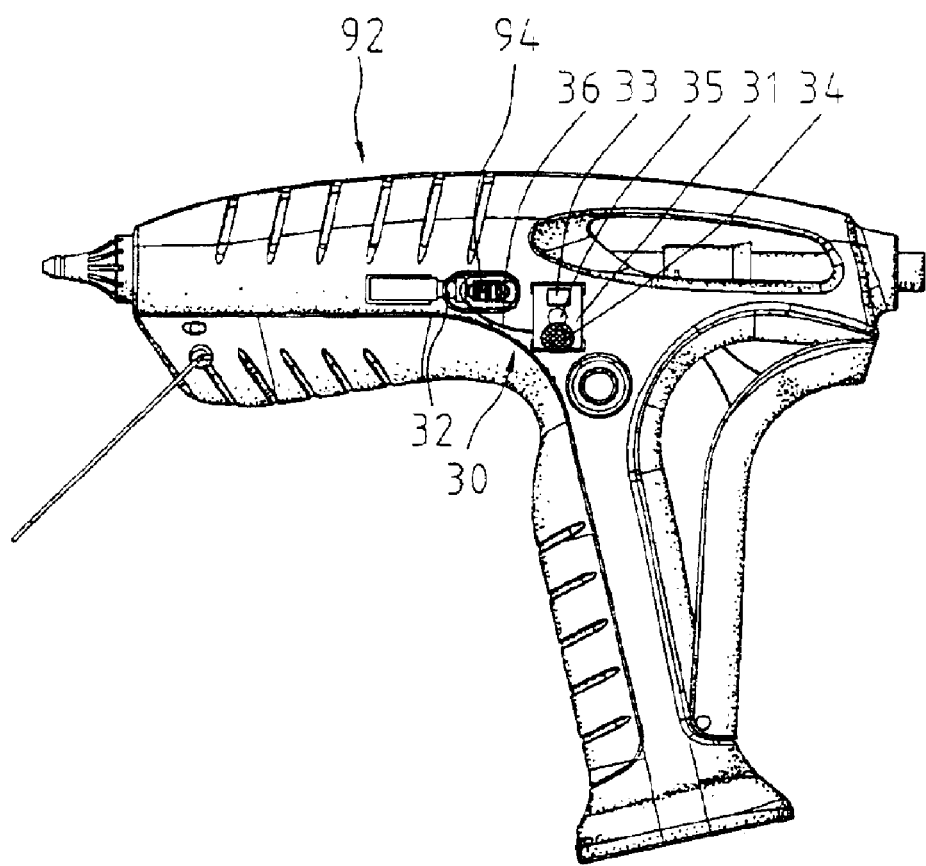
FIG. 5 is a side view of a fuel-based gluing tool with a vocal function according to a fourth embodiment of the present invention.

Referring to FIG. 5, according to a fourth embodiment of the present invention, the vocal device 30 is used in a fuel-based gluing tool 92 for providing thermoplastic glue. The fuel-based gluing tool 92 includes a switch 94 installed on a proper portion of the fuel-based gluing tool 92. The button 32 can be pushed via moving the switch 94.

The present invention has been described through detailed illustration of some embodiments. Those skilled in the art can derive variations from the embodiments without departing from the scope of the present invention. Hence, the embodiment shall not limit the scope of the present invention defined in the claims.

What is claimed is:

1. An fuel-based appliance comprising a switch installed thereon and a vocal device installed therein, wherein the vocal device includes a circuit board, a chip installed on the circuit board, a speaker installed on the circuit board and a button that is connected with the circuit board and that can be pressed via moving the switch.

2. The fuel-based appliance according to claim 1 wherein the vocal device includes a battery installed on the circuit board.

3. The fuel-based appliance according to claim 1 wherein the fuel-based appliance is a fuel-based hair dryer.

4. The fuel-based appliance according to claim 1 wherein the fuel-based appliance is a fuel-based curling iron.

5. The fuel-based appliance according to claim 1 wherein the fuel-based appliance is a gas burner.

6. The fuel-based appliance according to claim 1 wherein the fuel-based appliance is a fuel-based gluing tool for providing thermoplastic glue.

\* \* \* \* \*